No. 740,854. PATENTED OCT. 6, 1903.
G. M. HILGER.
STEAM TRAP.
APPLICATION FILED MAR. 18, 1903.
NO MODEL. 2 SHEETS—SHEET 1.

WITNESSES
J. F. Pattison
R. B. Cavanagh

INVENTOR
George M. Hilger
BY
Munn
ATTORNEYS.

No. 740,854. PATENTED OCT. 6, 1903.
G. M. HILGER.
STEAM TRAP.
APPLICATION FILED MAR. 18, 1903.
NO MODEL. 2 SHEETS—SHEET 2.
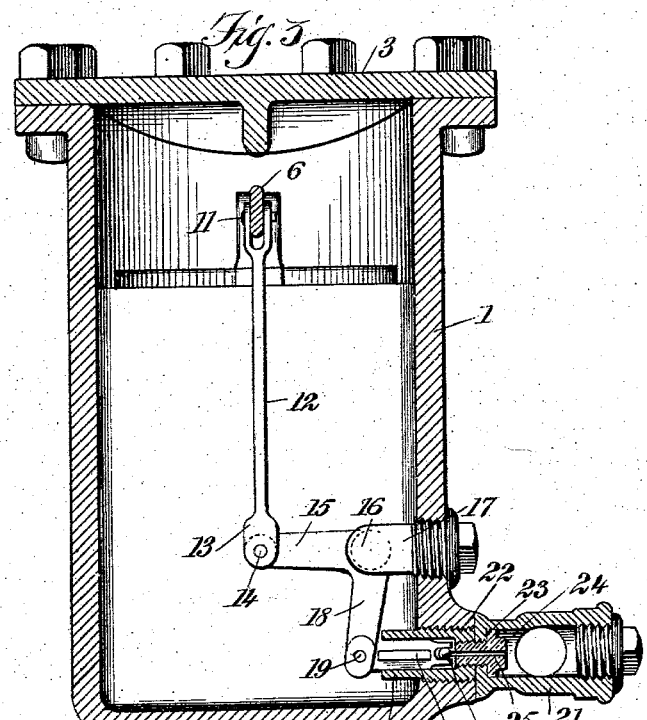
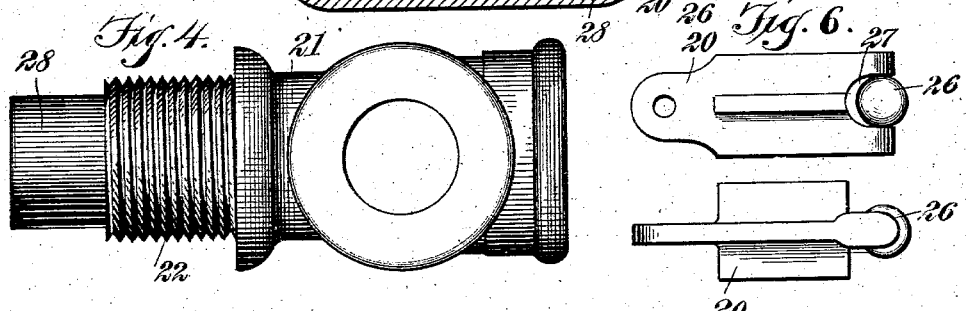
INVENTOR
George M. Hilger
BY
ATTORNEYS.

No. 740,854. Patented October 6, 1903.

UNITED STATES PATENT OFFICE.

GEORGE MICHAEL HILGER, OF CHICAGO, ILLINOIS.

STEAM-TRAP.

SPECIFICATION forming part of Letters Patent No. 740,854, dated October 6, 1903.

Application filed March 18, 1903. Serial No. 148,365. (No model.)

*To all whom it may concern:*

Be it known that I, GEORGE MICHAEL HILGER, a citizen of the United States, and a resident of Chicago, in the county of Cook and State of Illinois, have invented new and useful Improvements in Steam-Traps, of which the following is a full, clear, and exact description.

This invention relates to certain novel and useful improvements in steam-traps for receiving the water condensed from a steam heating or other apparatus.

In carrying out the present invention I have particularly in view the providing of an extremely simple device which shall receive the water condensed from steam-coils or similar apparatus where it is required to remove the condensation in order to preserve what is commonly known as "dry" steam.

A further object of the invention is to form the chamber or vessel of my improved apparatus in two parts and provide the same with a mechanism for operating the valve of the trap.

A further object of the invention is to so construct or correlate the various parts of my improvement that at certain periods the valve will be operated by the water in the trap when it reaches a certain height and will be opened to permit the escape of such water therefrom.

With these and other objects of a similar nature in view my invention consists in the construction, combination, and arrangement of parts, as is herein described in this specification, delineated in the accompanying drawings, and set forth in the appended claims.

Reference is to be had to the accompanying drawings, forming a part of this specification, in which similar characters of reference indicate corresponding parts in all the figures.

Figure 1:
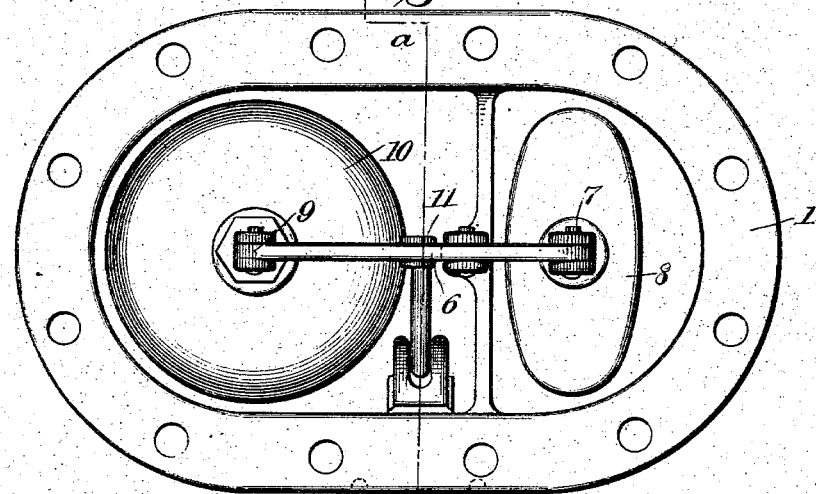
Figure 2:
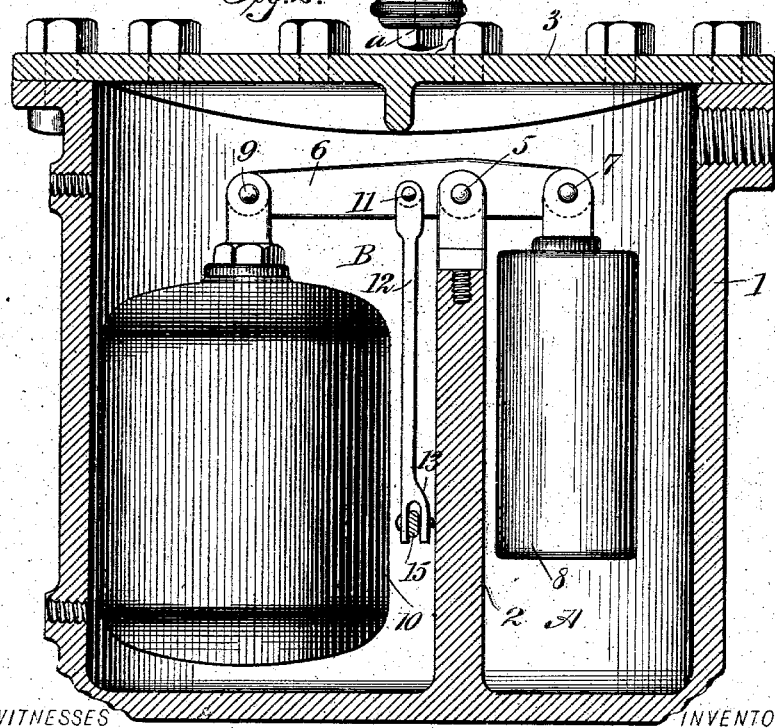

Figure 1 is a top plan view of a device embodying my improvement, the top of the trap being removed therefrom to show the arrangement of the floats or weights therein. Fig. 2 is a longitudinal vertical sectional view taken through the chamber or vessel and showing the floats or weights in elevation. Fig. 3 is a transverse vertical sectional view taken on the line *a a* of Fig. 1; and Figs. 4, 5, and 6 are detail views of portions of the valve.

Referring now to the accompanying drawings in detail, wherein I have shown an embodiment of my invention, 1 designates the tank or chamber of the trap, which in the present instance is shown as elliptical in cross-section and is divided into two compartments A B through the medium of the vertically-extending partition 2, which partition, however, is of less height than the walls of the chamber or tank, so that a space is left between the top 3 of the tank and the upper edge of said partition. The water which is condensed from the steam is adapted to enter the cylinder A through the inlet 4 at the top of the tank. To the top of the partition 2 there is hinged, as at 5, the cross-arm 6, having pivoted at one end, as at 7, a weight or float 8, which is of any suitable material, such as metal or the like, while from the other end of the aforesaid arm is suspended at 9 a weight 10, adapted to move up and down in the chamber B, such weight or float 10 being of relatively greater size than the float 8. At the point 11 on the arm 6 is secured the bifurcated end portion of the downwardly-extending lever 12, which lever is connected at its lower end 13, through the medium of a pivot-bolt 14, with the arm 15 of a bell-crank lever, such lever being pivoted at 16 to the shank of the screw-plug 17, the opposite arm 18 of said bell-crank lever being connected at 19 to the guide-arm 20 of the valve. The construction of this valve and valve-seat is clearly shown in Figs. 3, 4, 5, and 6. The valve-seat in the present instance is constructed within the body of the T-joint 21, which joint is screwed, as at 22, into the boss formed at the lower end of the tank or chamber, the discharge-pipes leading in any desired directions from the aforesaid T-joint. As will be seen, particularly on reference to Fig. 3, the interior of said T is provided with an annular shoulder, as at 23, adapted to receive the screw-threaded stud 24, which is provided with a longitudinally-extending aperture 25, through which the waste or water from the trap passes into the discharge-pipe. This aperture or passage 25 in the stud is controlled by the ball-valve 26, held within the bifurcated portion 27 of the guide-arm 20 through the medium of any suitable pin or axle. The arm 20, carrying the valve, is guided in its movement to and from the valve-seat through the medium of the tubular thimble 28, formed at the extreme inner end of the T-joint 21.

From the above description, taken in connection with the accompanying drawings, the operation of my improved device will be readily apparent. Water is admitted through the inlet 4 into the chamber A, and when it reaches such a height as to overcome the weight of the balance-float 8 the float 10 in the opposite compartment B will sink or travel toward the bottom of the chamber and will, through the medium of the lever connections before described, force the valve 26 upon the valve-seat 23. As the water continues to enter the compartment A it will reach the top of the partition 2 and overflow into the chamber B. When a sufficient quantity of water has entered the chamber B to overcome the weight of the float 10, it will overcome the pressure on the valve, thus causing the float to rise in the compartment, and will, through the medium of the lever mechanism, operate the valve to permit the discharge of the water from the tank.

It will be observed that I have provided an extremely simple and durable device which is automatic in its operation and performs its work without requiring the attention of an operator.

While I have herein shown and described one particular embodiment of my invention, it is of course to be understood that I do not limit myself to the precise details of construction shown herein, as there may be modifications and variations in certain respects without departing from the essential features of the invention or sacrificing any of the advantages thereof.

Having thus described my invention, I claim as new and desire to secure by Letters Patent—

1. A device of the class described, comprising a chamber, having an inlet and an outlet, a partition dividing said chamber into two communicating compartments, a float mechanism pivotally supported on said partition, a valve controlling the outlet, and means for operating said valve, said means comprising a rod connected with the float mechanism, and a bell-crank lever pivoted to a projection extending inward of the chamber, said bell-crank lever being connected to the rod and to the valve, the construction being such that the valve may be moved to and from the outlet, substantially as set forth.

2. A device of the class described, comprising a chamber having an inlet and an outlet, a partition dividing said chamber into two communicating compartments, an arm pivotally supported on said partition, floats of different weight suspended at the extremities of said arm, a valve controlling said outlet, and means, comprising a bell-crank lever and a pivoted rod, connecting said arm with the valve, the construction being such that when the arm is moved by the rising and falling of the floats in the chambers the valve will be actuated, substantially as set forth.

3. A device of the class described, comprising a chamber having an inlet and an outlet, a partition dividing said chamber into two compartments, an arm pivoted to said partition, floats of varying weight suspended from the extremities of said arm and adapted to rise and fall in the chambers according to the amount of water therein, a spherical valve controlling said outlet from a guide-arm supporting said valve, means connecting said guide-arm with the pivoted arm, the construction being such that when the floats rise or fall in the compartments, the valve will be moved, and means for directing the valve-carrying arm in its movement to and from the valve-seat, substantially as set forth.

In testimony whereof I have signed my name to this specification in the presence of two subscribing witnesses.

GEORGE MICHAEL HILGER.

Witnesses:
RAY WEIMERSKIRCH,
OTTO WEIMERSKIRCH.